(12) United States Patent
Hausler et al.

(10) Patent No.: US 6,758,632 B2
(45) Date of Patent: Jul. 6, 2004

(54) LUBRICATION SYSTEM FOR A TOOL WITH A COMBUSTION ENGINE

(75) Inventors: Wolfgang Hausler, Munich (DE); Georg Sick, Feldafing (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

(21) Appl. No.: 10/363,844
(22) PCT Filed: Sep. 13, 2001
(86) PCT No.: PCT/EP01/10601
§ 371 (c)(1),
(2), (4) Date: Mar. 6, 2003
(87) PCT Pub. No.: WO02/23017
PCT Pub. Date: Mar. 21, 2002

(65) Prior Publication Data
US 2003/0185627 A1 Oct. 2, 2003

(30) Foreign Application Priority Data
Sep. 15, 2000 (DE) .......................... 100 45 726

(51) Int. Cl.[7] ............................... F01M 1/12
(52) U.S. Cl. .............................. 404/133.1; 404/133.05; 184/109
(58) Field of Search .................... 404/133.05, 133.1, 404/133.2; 123/196 R; 305/117; 184/6, 109

(56) References Cited

U.S. PATENT DOCUMENTS

| | | | |
|---|---|---|---|
| 3,286,790 A | * 11/1966 | Kestel | 184/6 |
| 3,630,127 A | * 12/1971 | Yamato | 404/133.1 |
| 4,015,909 A | * 4/1977 | Yamamoto | 404/133.1 |
| 4,721,185 A | 1/1988 | Weigle | |
| 5,816,212 A | 10/1998 | Lindquist et al. | |

FOREIGN PATENT DOCUMENTS

| | | |
|---|---|---|
| DE | 35 26 194 A1 | 2/1987 |
| DE | 43 04 743 A1 | 8/1994 |

* cited by examiner

Primary Examiner—Gary Hartmann
(74) Attorney, Agent, or Firm—Boyle Fredrickson Newholm Stein & Gratz S.C.

(57) ABSTRACT

A tool consists of a combination engine in the form of a two-cycle engine, and a motion conversion device which is connected to said combustion engine and which is located in a housing. The housing is filled with oil for lubricating the motion conversion device. A conveying device with which the oil is conveyed from the housing to the combustion engine is provided, said combustion engine being lubricated exclusively with oil from the housing and having no separate oil supply.

13 Claims, 5 Drawing Sheets

LUBRICATION SYSTEM FOR A TOOL WITH A COMBUSTION ENGINE

BACKGROUND OF THE INVENTION

1. Field of the Invention

The invention relates to a tool in accordance with the preamble of claim 1.

2. Description of the Related Art

Tools, in particular hand-held tools, such as e.g. a rammer for ground compaction purposes, which comprise a combustion engine as the drive are known in various forms. Two-cycle engines have proven to be particularly suitable as combustion engines and have a high specific output and are not dependent upon position when using suitable carburettors so that they can even be used in a steeply inclined position.

In essence, two principles are known for the lubrication of two-cycle engines, namely petroil lubrication, in which oil is already admixed beforehand to the fuel at a mixing ratio of 1:25 to 1:100, and separate-lubrication, in which oil is pumped from a separate oil tank by means of an oil pump into the crank housing or the carburettor nozzle. Both lubricating methods help make it possible to utilise two-cycle engines in any position and also serve to keep the weight of such engines low.

Whereas during petroil lubrication the oil must be added to the fuel during each fuelling procedure, it is necessary in the separate-lubricating process to top up the separate oil tank at regular intervals, as in the case of two-cycle engines there is basically a loss lubrication, i.e. there is no oil circulation. Apart from the weight of the additional oil tank, the requirement for regular cleaning and also the provision of an oil tank indication, safety devices are required which prevent the engine from starting-up if oil supplies are not sufficient. These devices increase considerably the complexity and the weight of the essentially simple and robust two-cycle engine.

DE 198 00 904 A1 discloses a combustion engine for a tool, wherein a cam drive for a valve control of the engine is lubricated by means of an oil sump. The rotational movement of the toothed wheels which are associated with the cam drive serves to generate an oil mist which can be guided into a crank housing of the engine where it lubricates the moving parts.

OBJECT AND SUMMARY OF THE INVENTION

It is the object of the invention to provide a tool having a lubricating system for the combustion engine, wherein the complexity is reduced with respect to lubricating systems which are known from the prior art.

The tool is characterised in that the combustion engine can be lubricated by the oil from the housing.

With respect to the invention, it is assumed that the tool is already provided with a large quantity of oil, namely for the purpose of lubricating the movement-conversion device, i.e. the transmission in the housing. In accordance with the invention, this oil is then also used for the purpose of lubricating the combustion engine. The oil from the transmission is consequently consumed over the course of time. An additional oil tank as in the case of the known separate-lubricating procedure is thus not required nor is it necessary to fill the tool with an oil-fuel mixture.

In an advantageous manner, the combustion engine can be lubricated exclusively with the oil from the housing and the oil quantity provided in the housing is such that it is sufficient for the purpose of lubricating the movement-conversion device and the combustion engine during a predefined servicing interval. This relieves the operator of the obligation of checking the oil level at regular intervals, of topping up the oil or supplying a mixture. On the contrary, topping up the oil into the housing which accommodates the movement-conversion device is performed by a specialist within the scope of a service inspection which must be carried out at regular intervals in any case for such highly stressed tools.

In an advantageous manner, a conveying device is provided for the purpose of conveying oil from the housing, which surrounds the movement-conversion device, to the combustion engine.

Since the quantity of oil present is thus limited, it is necessary to use the oil extremely economically during lubrication of the oil-consuming combustion engine.

Thus, in the case of a particularly advantageous embodiment of the invention, the oil which is supplied to the combustion engine is provided in the form of an oil aerosol, i.e. as oil mist. The oil aerosol is generated in the housing by means of the movement-conversion device, in which numerous components move at high speed, whereby the oil provided in a sump is extensively centrifuged in the form of droplets and very finely atomised.

In the case of an advantageous development of the invention, the oil or oil aerosol is collected by means of a collecting device, which is coupled to the conveying device, in the housing. In order to assist the collecting procedure, it is expedient if the conveying device comprises a suction device. In order to be able to transport the oil to the combustion engine, it is also advantageous if the conveying device comprises a pressure-generating device for the purpose of generating a pressure gradient between the housing-side and the combustion engine-side. The pressure-generating device can also serve to pressurise the oil or the oil aerosol and to inject it at the combustion engine.

In the case of a particularly advantageous embodiment of the invention, the pressure-generating device comprises a pressure reservoir which is coupled to a combustion chamber of the combustion engine. Upon ignition of the air-fuel mixture, there is a sudden increase in the pressure in the combustion engine, wherein some of the high pressure passes in the form of pressurised exhaust gas from the combustion chamber into the pressure reservoir.

As already discussed above, the oil or oil aerosol provided must be used extremely sparingly, so that the oil supply is sufficient over the servicing interval. It has proven to be particularly advantageous, if the oil or the oil aerosol can be discharged in a region of a contact surface between a piston and a cylinder of the combustion engine. The contact surface is the region of the combustion engine which in tribological terms is loaded to the greatest extent and is thus in greatest need of lubrication.

In the case of a particularly advantageous embodiment of the invention, there is provided an oil outlet which is fed by the conveying device and through which the oil or oil aerosol can be discharged, depending upon the position of the piston in the cylinder, on to a running surface of the piston shaft and on to a running surface of the cylinder lying opposite the oil outlet. As a consequence, the contact surface between the piston and the cylinder can be wetted in a controlled manner with oil or the oil aerosol.

The conveying device which guides the oil from the housing to the combustion engine can be controlled in an advantageous manner in dependence upon the operating state of the engine. For example, it has been shown that the combustion engine does not require lubrication in the no-load state, whereas in the full-load state there is an increased requirement for lubrication. The controllability of the conveying device again considerably enhances the ways of utilising the limited oil supplies economically.

BRIEF DESCRIPTION OF THE DRAWINGS

This and further advantages and features of the invention will be explained in detail hereinunder by preferred examples with reference to the accompanying Figures, in which.

DETAILED DESCRIPTION OF THE PREFERRED EMBODIMENTS

Figure 1:
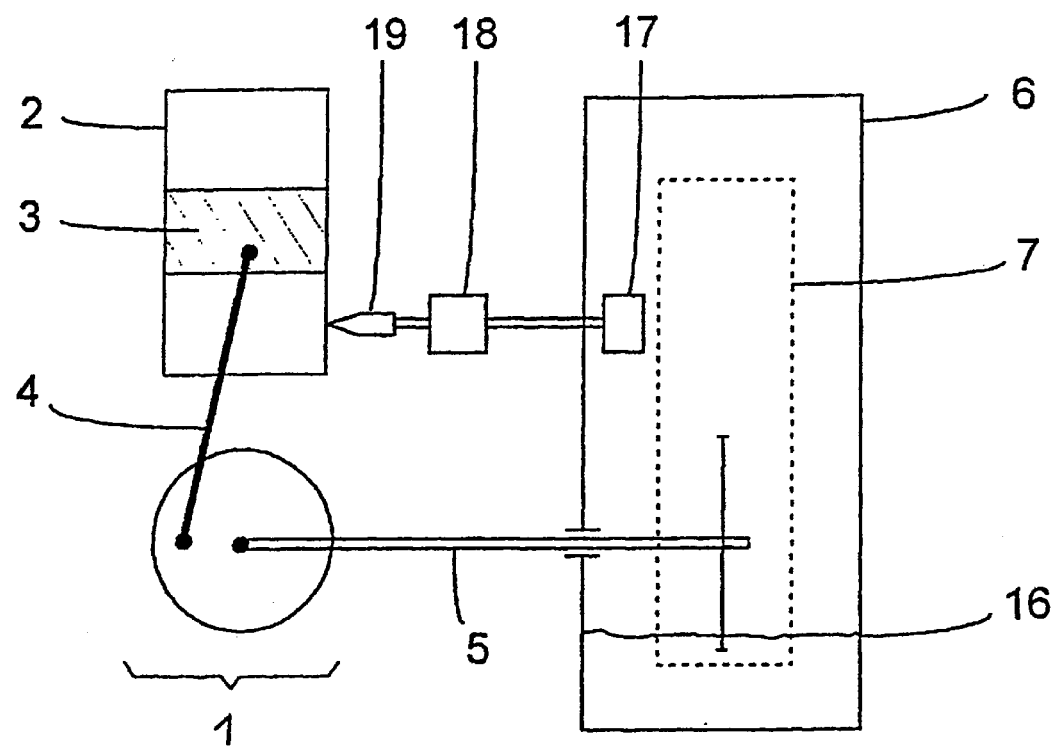
FIG. 1 shows a schematic illustration of the structure of a tool in accordance with the invention.
Figure 2:
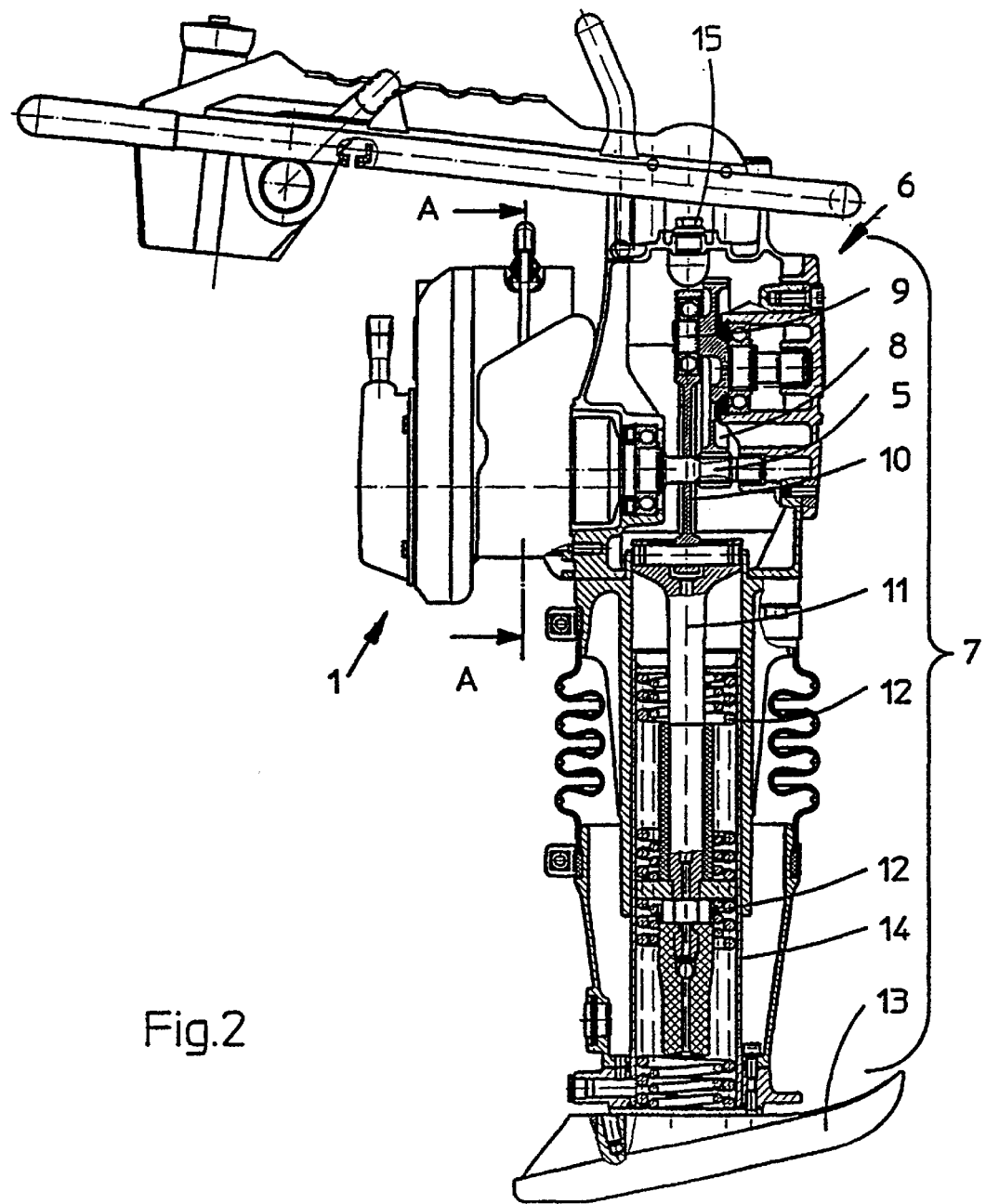
FIG. 2 shows a rammer for ground-compaction as an example of a tool in accordance with the invention.

FIG. 1 shows a schematic illustration of the structure of a tool in accordance with the invention, which can be, for example, a hand-held rammer for ground-compaction purposes as shown in FIG. 2 in the partial sectional illustration. In principle, like components in FIGS. 1 and 2 are thus also designated by like reference numerals.

A cylinder 2 and a piston 3, which can move in the cylinder 2, are disposed in a known manner in a combustion engine 1 which is known per se and is formed as a two-cycle engine, said piston causing rotation of a crank shaft or a drive shaft 5 by means of a connecting rod 4.

The drive shaft 5 extends from the housing of the combustion engine 1 into a housing 6 which surrounds a movement-conversion device 7. In the case of the rammer as shown in FIG. 2, the movement-conversion device 7 comprises a toothed wheel pair 8, a crank drive 9 and a stamping piston 11 which is driven by way of a connecting rod 10 and which by way of a spring system 12 causes a tube 14, which is associated with a stamping base 13, to carry out a stamping movement. Since this operating principle has been known for a long time, a further detailed description thereof is superfluous. The movement-conversion device 7 is sketched in FIG. 1 merely in a schematic manner in the form of a toothed wheel and a frame, as illustrated by dotted lines, which surrounds said toothed wheel.

The movement-conversion device 7 can thus comprise different types of toothed wheel transmissions, crank transmissions, etc. and serves substantially to change the directions of movement, types of movement (translatory, rotary; continuous, intermittent, oscillatory, jerky, etc.) and movement speeds.

The moving components of the movement-conversion device 7 are lubricated with oil. In the case of the example shown in FIG. 2, oil is introduced into the housing 6 and the movement-conversion device 7 after removal of an oil inlet screw 15 and ultimately accumulates in the form of an oil sump at the bottom in the ramming system on movement-conversion device 7.

By reason of the high speeds of the moving components of the movement-conversion device 7, oil is extensively centrifuged in a continuous manner and swirled in the form of large and small droplets. After merely a short period of time, an oil mist consisting of an oil aerosol and made up of extremely fine droplets of oil is formed in the housing 6 and this wets all of the parts which are to be lubricated.

In the case of the tool in accordance with the invention, this oil aerosol, which swirls in the housing 6 is captured and guided to the combustion engine 1 where it also used for lubrication purposes.

To this end, the housing 6 is provided with a collecting device 17 which constitutes substantially an orifice in the housing 6, into which the oil aerosol can issue. At this site, it can be expedient to provide a filter or a porous, sponge-like material, in order to filter the oil aerosol or to allow merely the finest oil droplets through, and no particles of dirt which may be present.

A conveying device 18 serves to guide the oil aerosol from the collecting device 17 to an oil outlet which is formed as a nozzle 19. The conveying device 18 can be formed in various ways. For example, it has thus been found that the oil aerosol can also be transported through hoses having an extremely small diameter over a relatively long distance. It is thus even sufficient to generate a low pressure gradient, in order to transport oil from the collecting device 17 to the nozzle 19.

The design of the conveying device 18 depends substantially upon whether a pressure must be generated at the nozzle 19 and if so at what level. Apart from conveying devices familiar to the person skilled in the art, it has also proven advantageous to use a pressure-generating device which will be explained hereinunder with reference to FIG. 5. Equally, it can be expedient for oil to be supplied to the conveying device 18 in liquid form and not as an oil aerosol and for the oil to be changed into an aerosol only by the conveying device 18. Techniques suitable for this purpose are ones which are known in the field of ink-jet printers (bubble-jet or ink-jet principle). Accordingly, it is also possible to use, for example, piezo-actuators. Since the oil and oil aerosol quantities to be conveyed are very small, it is also sufficient to operate the conveying device 18 at minimum conveying power.

In order to render it possible to consume the oil in the combustion engine 1 in the most economic manner possible, in the case of the tool in accordance with the invention only the part of the combustion engine 1 which is most highly loaded in tribological terms is wetted with oil. This relates to the contact surface between the piston 3 and the cylinder 2, in particular the contact surface between piston rings 20, which are inserted into the piston 3, and the cylinder 2.

It has proven to be particularly advantageous to wet the so-called piston sleeve, i.e. a piston shaft 21 below the piston rings 20, with oil.

Figure 3:
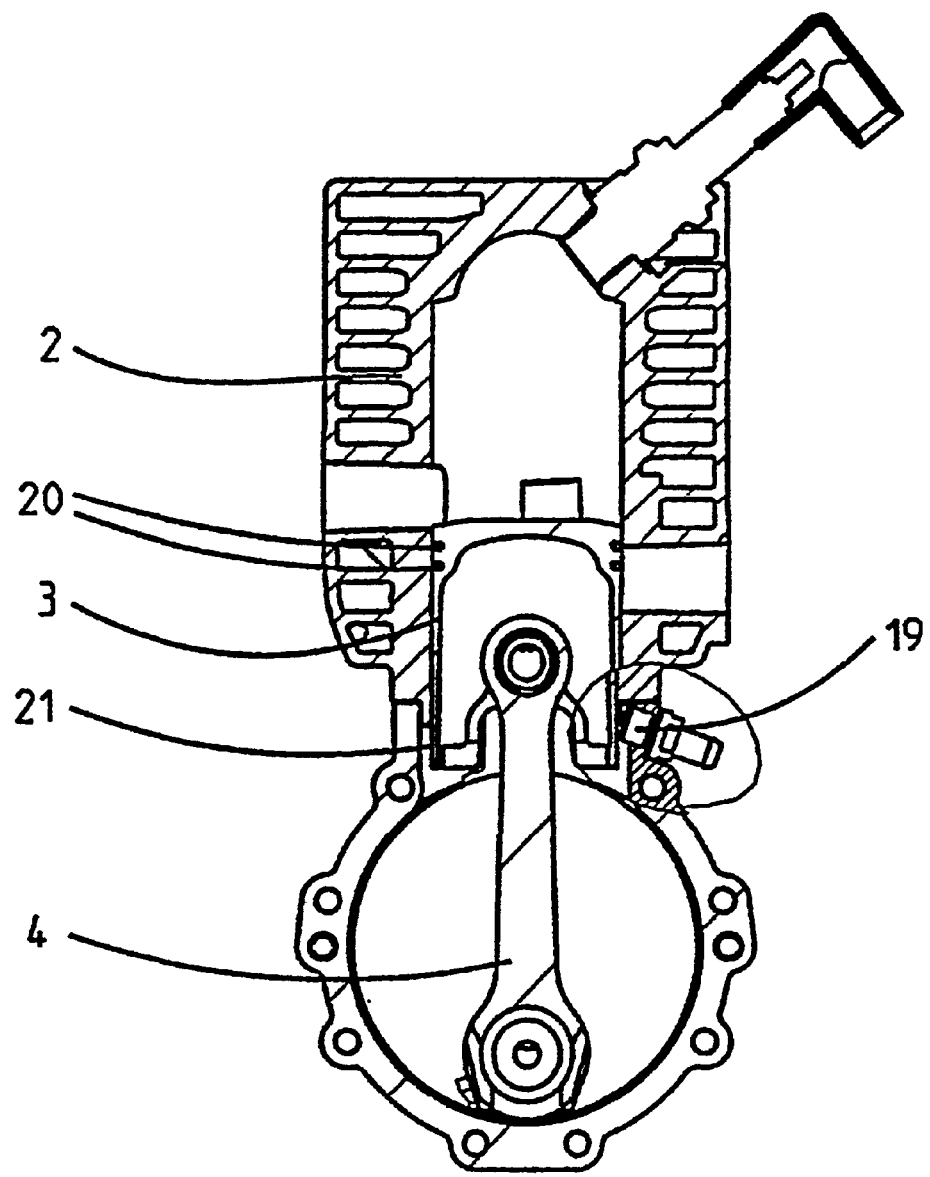
FIG. 3 shows a sectional view of a combustion engine in the direction of the arrows A in FIG. 2, wherein a piston is positioned in the bottom dead centre.
Figure 4:
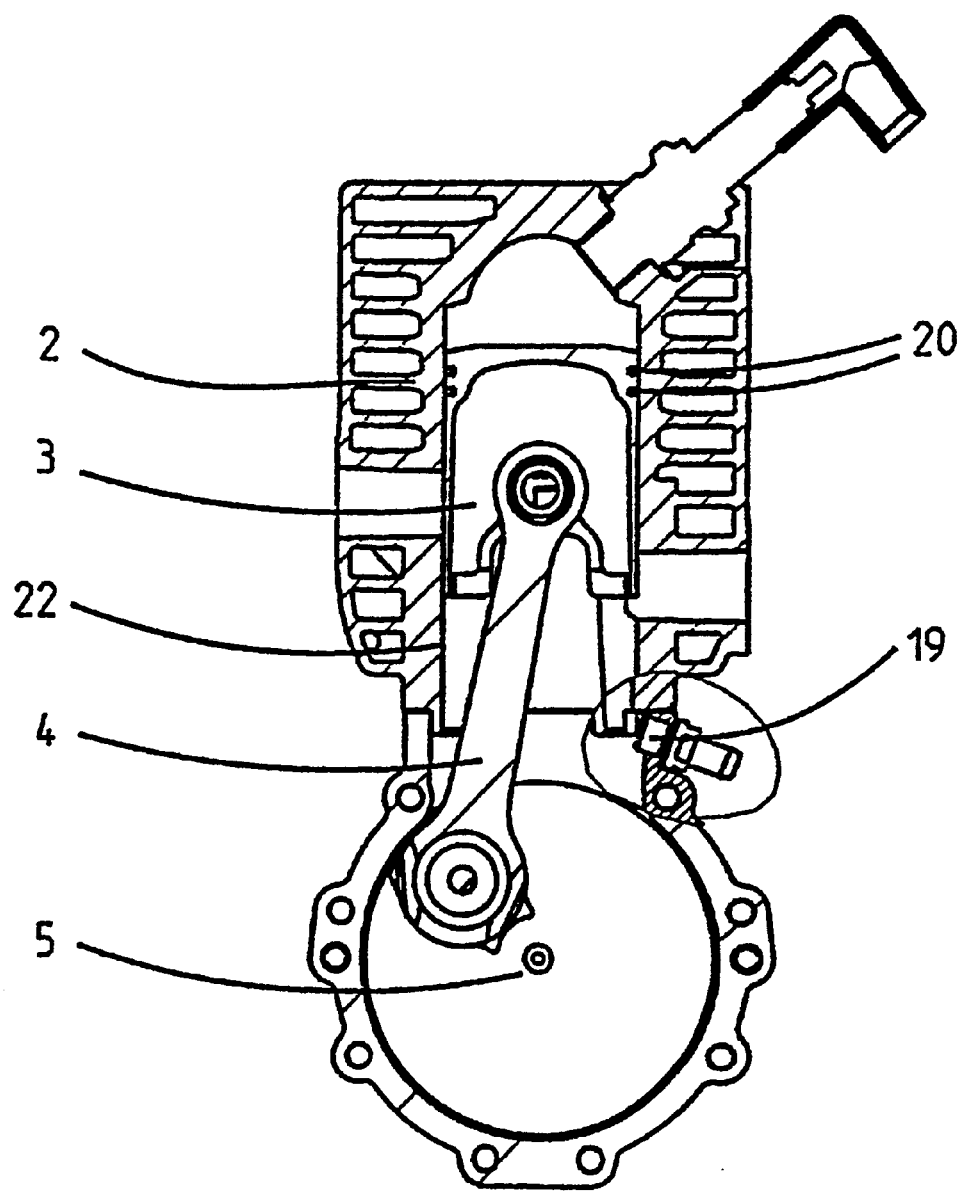
FIG. 4 shows a sectional view as shown in FIG. 3, wherein the piston is positioned shortly before the top dead centre.

FIGS. 3 and 4 show a sectional view of the combustion engine 1 of FIG. 2, as seen in the direction of the arrows A.

In FIG. 3, the piston 3 is at the bottom dead centre, as can be seen from the relative position between the connecting rod 4, the piston 3 and the cylinder 2. Accordingly, FIG. 4 shows a position shortly before reaching the top dead centre.

The piston rings 20 are inserted into the piston 3.

The nozzle 19 which has already been discussed in connection with FIG. 1 and is used as an oil outlet is inserted directed in an inclined manner upwards below a cylinder running surface 22, i.e. the inner surface of the cylinder 2. As shown in FIG. 3, oil or the oil aerosol can be sprayed via the nozzle 19 on to the piston shaft 21, if the piston 3 is located at the bottom dead centre. Then, namely the outer surface of the piston shaft 21 is freely accessible.

In contrast, if the piston 3 has moved upwards into the cylinder 2, the running surface 22 of the cylinder 2 is exposed and can then be wetted with oil by the nozzle 19. Therefore, it is possible to lubricate sufficiently the most extensively loaded parts of the combustion engine 1 with extremely small oil quantities. For example, the previously discussed control of the conveying device 18 can be configured in such a manner that it takes into consideration the respective piston position and only provides oil at suitable points in time. Naturally, the oil can also be injected in a continuous manner.

Instead of using the nozzle 19, it is also possible to use a nozzle ring which extends around the periphery of the piston 3. In order to reduce the consumption of oil still further, the use of so-called wedge-type rings as piston rings 20 has proven to be advantageous. Moreover, the piston shaft 21 should be provided with an emergency running coating, e.g. consisting of Graphal®.

The further movable parts of the combustion engine 1 which are not lubricated at all or not sufficiently lubricated with oil must have life-time lubrication or consist of suitable materials to withstand relatively high thermal loading. However, it is to be assumed that small residual quantities of oil issue out at the piston 3 and can be used for the purpose of lubricating the other components. All other sliding surfaces which require lubricant (for example, crank shaft bearing arrangement) can be equipped with sealed bearings which have life-time lubrication.

The features described have rendered it possible to improve the mixing ratio of oil to petrol to 1:800 which means that the quantity of oil present in the housing 6 of the tool is sufficient to guarantee the lubrication of both the movement-conversion device 7 and also the combustion engine 1 during an entire servicing interval. In any event, at the end of the servicing interval, the tool must be inspected by a qualified engineer. This provides the opportunity of replenishing the oil supply in the housing 6.

Figure 5:
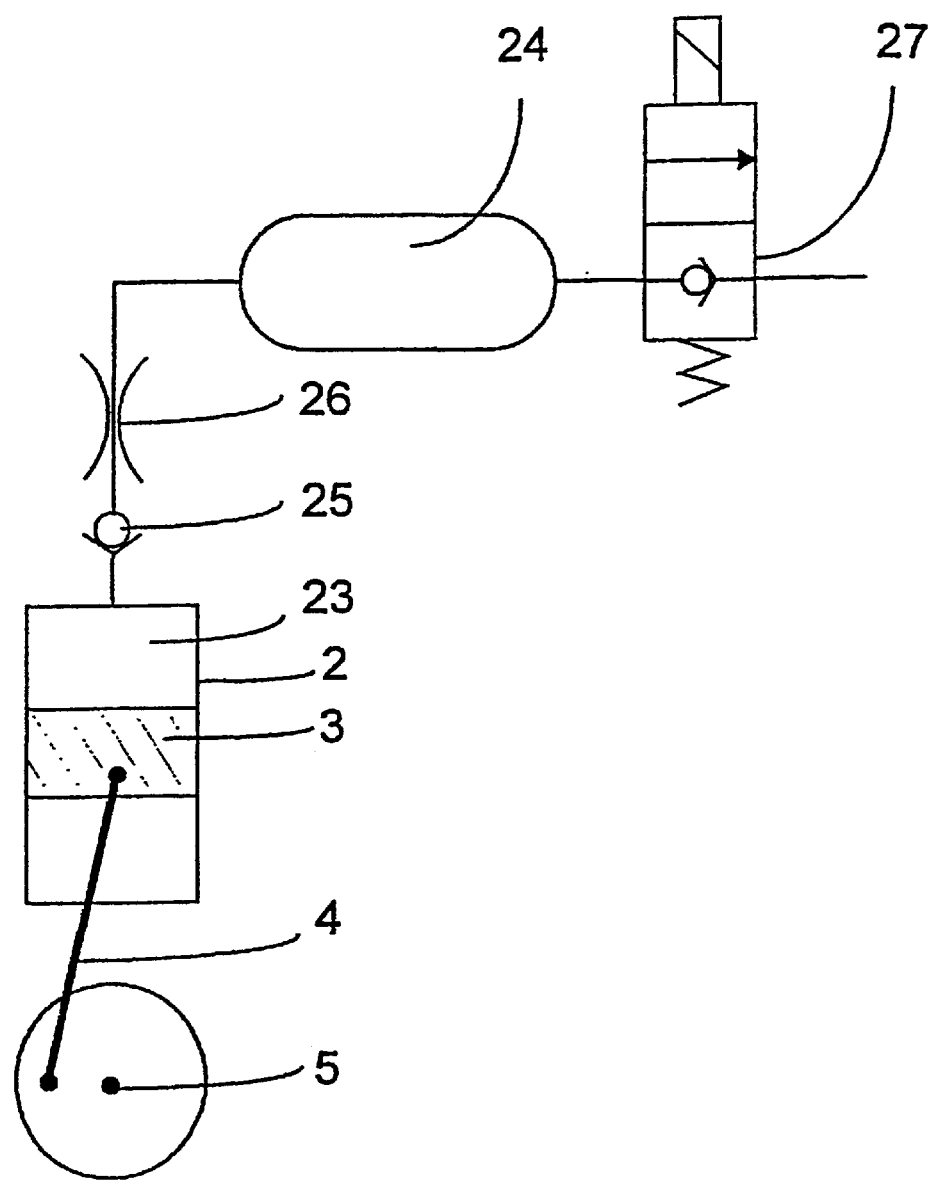
FIG. 5 shows a schematic illustration of a pressure-generating device associated with the invention.

FIG. 5 shows one possible inventive way of providing pressure which can be utilised by the conveying device 18.

For this purpose, a combustion chamber 23 which is formed by means of the cylinder 2 and the piston 3 is connected to a pressure reservoir 24 by way of a non-return valve 25 and a restrictor 26. A further valve 27 is provided for the purpose of emptying the pressure reservoir 24 or for removing the pressure-loaded gas.

After ignition of the air-fuel mixture in the combustion chamber 23, very high pressure is suddenly produced which is used not least to move the piston 3 downwards and to drive the drive shaft 5. However, a portion of the highly pressurised exhaust gas in the combustion chamber 23 passes via the non-return valve 25 into the pressure reservoir 24. Therefore, with each combustion stroke the pressure in the pressure reservoir 24 increases until finally there is a pressure equilibrium at the non-return valve 25. The pressure in the pressure reservoir 24 constitutes an energy medium which can be used for the purpose of driving or assisting the conveying device 18.

In order to limit the pressure in the pressure reservoir 24, a two-port, two-position directional control valve [not illustrated] can be used which interrupts further charging-up of the pressure reservoir 24 upon achievement of a predetermined pressure. Only when the pressure in the pressure reservoir 24 has fallen below the predefined control pressure, does the directional control valve render it possible to recharge the pressure reservoir 24. The pressure reservoir 24 does not have to be configured in the form of a conventional reservoir with a membrane and gas-filling arrangement. The presence of a short line piece can even be sufficient in certain circumstances for the purpose of storing and providing sufficient pressure for the conveying device 18.

We claim:

1. A ground-compaction device, comprising:

a combustion engine comprising at least one cylinder and a piston which can move in the cylinder; and a movement-conversion device, which is disposed in a housing, for the purpose of converting a rotational movement generated by the combustion engine into a working movement for ground-compaction; wherein the combustion engine is disposed on or in the housing; and the housing is filled with oil for the purpose of lubricating the movement-conversion device;

wherein said combustion engine is lubricated by the oil from the housing of the movement-conversion device, wherein the oil supplied to the combustion engine is discharged in the region of a contact surface between the piston and the cylinder.

2. Ground-compaction device as claimed in claim 1 wherein the combustion engine is lubricated exclusively with the oil from the housing.

3. Ground-compaction device as claimed in claim 1, wherein a conveying device is provided to convey oil from the housing to the combustion engine.

4. Ground-compaction device as claimed in claim 1, wherein the quantity of oil provided in the housing is such that it is sufficient to lubricate the movement-conversion device and the combustion engine during a predefined servicing interval.

5. Ground-compaction device as claimed in claim 1, wherein the oil which is supplied to the combustion engine is an oil aerosol.

6. Ground-compaction device as claimed in claim 5, wherein the oil aerosol is generated in the housing via the movement-conversion device.

7. Ground-compaction device as claimed in claim 3, wherein the housing is provided with a collecting device, which is coupled to the conveying device, for the purpose of collecting the oil or oil aerosol.

8. Ground-compaction device as claimed in claim 3, wherein the conveying device comprises a suction device.

9. Ground-compaction device as claimed in claim 3, wherein the conveying device comprises a pressure-generating device.

10. Ground-compaction device as claimed in claim 9, wherein the pressure-generating device comprises a pressure reservoir which is coupled to a combustion chamber of the combustion engine, wherein a pressure is generated in the pressure reservoir via exhaust gas from the combustion chamber during or immediately after a combustion procedure.

11. Ground-compaction device as claimed in claim 3, wherein the conveying device is controlled in dependence upon an operating state of the combustion engine.

12. Ground-compaction device as claimed in claim 1, wherein the oil or oil aerosol is discharged on to a running surface of a piston shaft of the piston.

13. Ground-compaction device as claimed in claim 12, wherein, in or below a running surface of the cylinder, there is provided an oil outlet which is coupled to the conveying device and through which the oil or the oil aerosol is discharged on to the running surface of the piston shaft and on to the running surface of the cylinder.

* * * * *